UNITED STATES PATENT OFFICE.

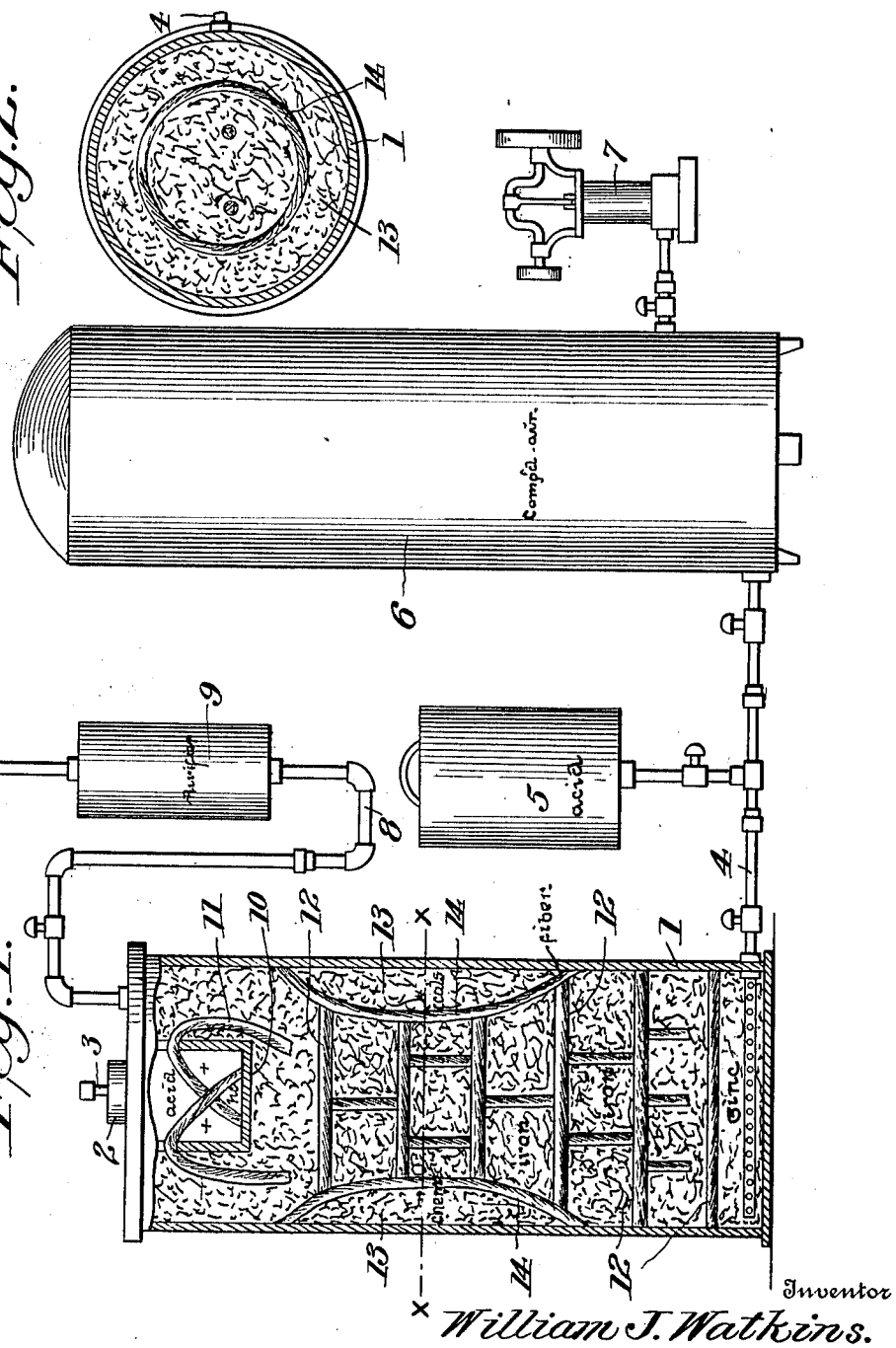

WILLIAM J. WATKINS, OF FORT WORTH, TEXAS, ASSIGNOR TO O. G. HURDLESTON, OF FORT WORTH, TEXAS.

PROCESS OF MANUFACTURING CARBURETED HYDROGEN GAS.

1,019,705.      Specification of Letters Patent.      Patented Mar. 5, 1912.

Application filed December 7, 1911. Serial No. 664,434.

*To all whom it may concern:*

Be it known that I, WILLIAM J. WATKINS, a citizen of the United States, residing at Fort Worth, in the county of Tarrant and State of Texas, have invented certain new and useful Improvements in Processes of Manufacturing Carbureted Hydrogen Gas, of which the following is a specification.

My invention relates to a process of manufacturing gas, and more particularly for manufacturing carbureted gas.

This invention is the process set forth in my pending application for Letters Patent of the United States, filed May 15, 1911, Serial Number 627,261, for apparatus for manufacturing carbureted gas.

The object of this invention is to manufacture at extremely small cost gas for heating, illuminating, and power purposes by multiplying many times the value of hydrocarbon oils for heating and lighting purposes.

Other objects and advantages will be fully explained in the following description and the invention will be more particularly pointed out in the claims.

Reference is had to the accompanying drawing which forms a part of this application.

The Figure 1 of drawing is a diagrammatic view, showing the gas generating tank in section. The drawing is furnished for convenience in explaining the invention. Fig. 2 is a horizontal section on line $x$— of Fig. 1.

A tank 1 is provided for the generation of gas. The tank 1 is provided with an air-tight or gas tight cap 2 through which is run a filling tube 3. A pipe 4 is connected to and extended within the lower part of the tank 1 and the part within the tank is perforated. A tank 5 for containing a supply of acid is connected with the pipe 4. The pipe 4 is connected with a compressed air-tank 6. An air-pump 7 is provided for forcing air into the tank 6. A service pipe 8 is connected with the tank 1 and the pipe is intercepted by a gas purifier 9. A vessel 10 is suspended near the top of the interior of the tank for containing acid and also hydro-carbon oils. The acid is placed in the vessel temporarily until the contents of the tank are saturated. After the contents of the tank are saturated with the acid, a supply of gasolene, kerosene, or other hydro-carbon oil is maintained in the vessel 10. The liquids are distributed to the contents of the tank by fiber ropes 11 which distribute the liquids by capillary action.

The material for generating gas in the tank 1 consists of zinc, or scraps of zinc, scrap iron or borings of iron, copper or sulfate of copper, black oxid of manganese, bicarbonate of soda or hydro-sulfite of soda, bicarbonate of ammonia, and fiber disks or fiber filler in the following proportions: 50 pounds of zinc, 200 pounds of iron, 25 pounds of fiber, with 10 pounds of black oxid of manganese, ten pounds of bicarbonate of soda, or hyposulfite of soda, and ten pounds of bicarbonate of ammonia. Fifty pounds of copper may be used instead of the fifty pounds of zinc. All these materials are first saturated with nitric acid. The zinc is placed in the bottom of the tank and is treated with nitric acid of $16\frac{2}{3}\%$ strength which is supplied from the tank 5. The other materials are treated with nitric acid from the vessel 10 and the acid used has a strength of 10%. The materials are placed in the tank 1 in the following manner: Zinc is placed on the bottom of the tank, then a layer of fiber 12. The layers of fiber form disks which separate the layers and make distributers for the acids and also for the liquid fuel or hydro-carbon oils. Iron is next placed on the disk 12. The fiber layers and the scrap iron then alternate to the upper part of the tank. Midway between the ends of the tank or between the upper and lower parts an annular compartment 13 is formed by an annular fiber partition 14. In the compartment 13 are placed several chemical compounds as follows: black oxid of manganese ($MNO_3$), carbonate of ammonia ($NH_4)_2CO_3$, and bicarbonate of soda ($NaHCO_3$).

When saturated with nitric acid, the reactions will be as follows:

$Zn + 4HNO_3 = Zn(NO_3)_2 + 2H_2O + 2NO_2$,
$2Fe + HNO_3 = 2Fe(NO_3)_3 + 2NO + 4H_2O$,
$MnO_2 + 2HNO_3 = Mn(NO_3)_2 + H_2O + O$;
$(NH_4)_2CO_3 + 2HNO_3 =$
$\phantom{XXXXXXX} 2NH_4NO_3 + H_2O + CO_2$,
and $NaHCO_3 + HNO_3 = NaNO_3 + H_2O + CO_2$.

The gases generated are carbureted by gasolene, kerosene, or other hydro-carbon oil, which is introduced into vessel 10 through filling tube 3 and thence distributed by the fiber ropes 11 and by the disks 12, the liquid hydro-carbon being converted into vapor by heat generated in the tank by the chemical reactions. The process is improved by adding copper scraps, or the sulfate of copper might be used. When copper is used the reaction will be as follows:

$$Cu_3 + 8HNO_3 = 3Cu(NO_3)_2 + 4H_2O + 2NO_3.$$

The process is still further improved by using hyposulfite of soda ($NaS_2O_4$) instead of bicarbonate of soda. The reaction will be $$2NaS_2O_4 + 2HNO_3 = 2Na_2SO_4 + 2NO_2 + 2H_2O + S.$$

Sulfuric acid can be used throughout the process instead of nitric acid, and there will be an advantage in using sulfuric acid because the sulfuric acid seems to be cheaper. When sulfuric acid is used the reactions will be:

$$Zn + H_2SO_4 = ZnSO_4 + H_2,$$
$$Fe + H_2SO_4 = FeSO_4 + H_2,$$
$$MnO_2 + 2H_2SO_4 = 2MnSO_4 + 2H_2O + O,$$
$$(NH_4)_2CO_3 + 2H_2SO_4 = 2NH_4SO_4 + H_2O + CO_2,$$
$$2NaS_2O_4 + 2H_2SO_4 = 3SO_2 + 2Na_2SO_4 + 2H_2O + S,$$

and $$Cu + 2H_2SO_4 = CuSO_4 + 2H_2O + SO_2.$$

The functions of the gases generated in the tank 1 will be to multiply the quantity of gaseous fuel for heating and illuminating purposes. The air pressure from the compressed air tank will thoroughly commingle the gases generated and they will be carbureted by the hydro-carbon oil. The air pressure is maintained during the generation of gas. The $CO_2$ will serve to dilute the rich hydro-carbon vapors.

As compared with the burning of gasolene gas or vapor, the process above set forth seems highly economical. There are 221 cubit feet approximately of gas or vapor generated from a gallon of gasolene. It has been demonstrated that one gallon of gasolene with the process herein set forth will make approximately three thousand (3,000) cubic feet of gas.

What I claim, is,—

1. The herein described process of manufacturing gas consisting of placing within an inclosure alternate layers of scraps of metal and fiber, arranging within said inclosure adjacent to said layers, a mixture of black oxid of manganese, carbonate of ammonia, hyposulfite of sodium, and sulfate of copper, saturating the entire mass with an acid, and then saturating the entire mass with a liquid hydrocarbon.

2. The herein described process of manufacturing gas consisting of placing within an inclosure alternate layers of scraps of metal and fiber, arranging within said inclosure and in communication with said layers a mixture of black oxid of manganese, carbonate of ammonia, hyposulfite of sodium, and sulfate of copper; treating the entire mass with an acid, supplying to the said entire mass a liquid hydro-carbon, and applying air under pressure to the entire contents of said inclosure.

3. The herein described process of manufacturing gas consisting of placing within an inclosure a layer of zinc scraps on the bottom of the inclosure, then alternate layers of fiber and iron scraps above the zinc scraps, and arranging about said layers within said inclosure a mixture of gas making chemicals, first saturating the entire mass with an acid and then with a liquid hydrocarbon, and applying air under pressure to the entire mass.

4. The herein described process of manufacturing gas consisting of placing within an inlosure a layer of zinc scraps on the bottom of the inclosure, then alternate layers of fiber and iron scraps above the zinc scraps, and arranging about said layers within said inclosure a mixture of black oxid of manganese, carbonate of ammonia, and hyposulfite of sodium, treating the entire mass first with an acid and then with a liquid hydrocarbon, and applying air-pressure to the entire mass.

In testimony whereof, I set my hand in the presence of two witnesses, this 15th day of November, 1911.

WILLIAM J. WATKINS.

Witnesses:
 A. L. JACKSON,
 J. R. HERNDON.

---

Copies of this patent may be obtained for five cents each, by addressing the "Commissioner of Patents, Washington, D. C."